United States Patent
Tesch et al.

(10) Patent No.: US 9,855,984 B2
(45) Date of Patent: Jan. 2, 2018

(54) UNDERBODY PANELLING PART OF WHEEL AXLE AND SUBASSEMBLY COMPRISING AN UNDERBODY PANELLING PART

(71) Applicant: Bayerische Motoren Werke Aktiengesellschaft, Munich (DE)

(72) Inventors: Gregor Tesch, Garching (DE); Markus Kohlhuber, Schweitenkirchen (DE); Rasmus Leicht, Eching (DE); Roland Schmidt, Stockdorf (DE); Hubert Scholz, Munich (DE); Matthias Hennig, Munich (DE); Ludwig Seethaler, Hebertshausen (DE); Roland Koenig, Habach (DE); Markus Fauser, Munich (DE)

(73) Assignee: Bayershire Motoren Werke Aktiegesellschaft, Munich (DE)

( * ) Notice: Subject to any disclaimer, the term of this patent is extended or adjusted under 35 U.S.C. 154(b) by 18 days.

(21) Appl. No.: 15/061,064

(22) Filed: Mar. 4, 2016

(65) Prior Publication Data

US 2016/0185402 A1    Jun. 30, 2016

Related U.S. Application Data

(63) Continuation of application No. PCT/EP2014/068262, filed on Aug. 28, 2014.

(30) Foreign Application Priority Data

Sep. 24, 2013   (DE) .................. 10 2013 219 212

(51) Int. Cl.
| | |
|---|---|
| B62D 35/02 | (2006.01) |
| B60R 13/08 | (2006.01) |
| B62D 25/20 | (2006.01) |

(52) U.S. Cl.
CPC .......... *B62D 35/02* (2013.01); *B60R 13/0861* (2013.01); *B62D 25/2009* (2013.01); *Y02T 10/88* (2013.01)

(58) Field of Classification Search
CPC ........ B62D 35/02; B62D 35/00; B62D 37/02; B60R 13/0861; B60G 2204/4308
(Continued)

(56) References Cited

U.S. PATENT DOCUMENTS

| | | | |
|---|---|---|---|
| 4,770,457 A * | 9/1988 | Tomforde | B62D 35/005 293/117 |
| 9,327,778 B2 * | 5/2016 | Wolf | B62D 35/02 |

(Continued)

FOREIGN PATENT DOCUMENTS

| | | |
|---|---|---|
| CN | 101003288 A | 7/2007 |
| DE | 102 09 591 A1 | 9/2003 |

(Continued)

OTHER PUBLICATIONS

Chinese-language Office Action issued in counterpart Chinese Application No. 201480046985.X dated Dec. 23, 2016 with English translation (29 pages).

(Continued)

*Primary Examiner* — Keith J Frisby
(74) *Attorney, Agent, or Firm* — Crowell & Moring LLP

(57) ABSTRACT

An underbody panelling part of a wheel axle near the wheel arch of a motor vehicle has a main part, the covering surface of which is variable, and a fastening structure for fixed connection to the body and/or a fastening structure for fixed connection to a transverse link of the motor vehicle. In the mounted state the covering surface can be varied with the steering angle.

15 Claims, 2 Drawing Sheets

(58) Field of Classification Search
USPC .......................................................... 280/157
See application file for complete search history.

(56) References Cited

U.S. PATENT DOCUMENTS

2007/0182207 A1  8/2007  Nakaya
2010/0217490 A1  8/2010  Canfield

FOREIGN PATENT DOCUMENTS

DE   10 2007 002 331 A1   10/2007
DE   10 2010 004 532 A1    8/2010
DE   10 2010 018 779 A1   11/2010

OTHER PUBLICATIONS

International Search Report (PCT/ISA210) issued in PCT Application No. PCT/EP2014/068262 dated Nov. 19, 2014 with English translation (seven pages).
German-language Written Opinion (PCT/ISA/237) issued in PCT Application No. PCT/EP2014/068262 dated Nov. 19, 2014 (six pages).
German Search Report issued in counterpart German Application No. 10 2013 219 212.6 dated Oct. 11, 2016 with partial English translation (12 pages).
Chinese Office Action issued in counterpart Chinese Application No. 201480046985.X dated Jun. 26, 2017 with English translation (12 pages).

* cited by examiner

UNDERBODY PANELLING PART OF WHEEL AXLE AND SUBASSEMBLY COMPRISING AN UNDERBODY PANELLING PART

CROSS REFERENCE TO RELATED APPLICATIONS

This application is a continuation of PCT International Application No. PCT/EP2014/068262, filed Aug. 28, 2014, which claims priority under 35 U.S.C. §119 from German Patent Application No. 10 2013 219 212.6, filed Sep. 24, 2013, the entire disclosures of which are herein expressly incorporated by reference.

This application contains subject matter related to U.S. application Ser. No. 15/061,022, entitled "Underbody Panelling Part of Wheel Axle and Subassembly Comprising an Underbody Panelling Part" filed on Mar. 4, 2016.

BACKGROUND AND SUMMARY OF THE INVENTION

The invention relates to an underbody panelling part of a wheel axle in the region of a wheel arch of a motor vehicle, and to a subassembly having an underbody panelling part of said type.

Against the background of the discussion regarding the reduction of $CO_2$ emissions of motor vehicles, measures for reducing fuel consumption play an ever greater role. These include, inter alia, the lowering of the air resistance of the vehicle. Whereas optimum solutions have long been sought in the case of vehicle body design, the reduction of the air resistance of the underbody of the vehicle has still not advanced very far. Here, however, there is major potential for improvement, because the underbody, after all, can account for approximately 20% of the overall air resistance.

In the region of the front axle with the steerable wheels, the particular challenge is to realize an underbody panelling which allows for the variable wheel position.

In this regard, DE 10 2010 018 779 A1 has proposed, generally, that a panelling part be held on the motor vehicle so as to be movable in a manner dependent on a pivoting movement of a link element.

It is an object of the invention to provide an underbody panelling part which can be easily arranged, in the region of a wheel axle, in the wheel arch, and which can realize an effective reduction in air resistance.

This is achieved according to the invention by way of an underbody panelling part of a wheel axle in the region of the wheel arch of a motor vehicle. The underbody panelling part has a main body, the covering surface of which is variable and which has a fastening structure for fixed connection to the vehicle body and/or a fastening structure for fixed connection to a transverse link of the vehicle. The covering surface can be varied as a result of a wheel steering deflection, such that the underbody panelling part can follow the steering movements of the steering wheel of the motor vehicle, and thus the gap dimensions between the underbody panelling part and the wheel or the wheel carrier can be optimally kept small. It is not necessary for the entire underbody panelling part to be arranged so as to be rotatable or pivotable. Instead, the variability of the main body of the underbody panelling part is utilized for reversible variation of its covering (and thus flow-guiding) surface, as viewed from below such that the required region of the underbody is covered or opened up by the underbody panelling part in a manner dependent on the wheel position.

The underbody panelling part is preferably firmly fixed both to the vehicle body, in particular to an inner side of the wheel arch, in sections, and firmly fixed to the transverse link at points. For example, an edge of the main body may be firmly screwed to the inner side of the wheel arch at least in sections.

Here, it is possible for a major part of the surface of the underbody panelling part to be left unchanged and for only a small section to be provided for being correspondingly varied with the wheel steering deflection.

The fixing may also offer the required opposing force for the reversible variation of the covering surface of the main body.

In a preferred embodiment, the main body is designed to be flexible, and preferably elastic to a certain extent, for the variation of the covering surface. It is contemplated for a preload to be built up in the direction of the wheel carrier.

For example, the main body may have at least one section which is laid in substantially parallel folds and which can be reversibly pulled apart transversely with respect to the folds. Here, the main body section may be designed in the form of a corrugated bellows with accordion-like folds. As material, use may be made, for example, of a suitable plastic or a suitable coated fabric.

The folds are preferably positioned such that they firstly ensure a low-resistance flow around them, and secondly, they impart the greatest possible flexural stiffness to the main body. The folds preferably run in a longitudinal direction of the vehicle. To improve stability, it is for example possible for the fold edges to be reinforced by longitudinal bars which have higher stiffness than the material stretched between them.

A variation of the surface can be easily realized here by way of a transverse force on the folded section of the main body, in the case of which the folds are pulled apart or pushed together transversely with respect to the longitudinal direction.

In a preferred embodiment, at least one transverse web which runs transversely with respect to the vehicle longitudinal axis and which is composed of an elastic material is provided in the panelling part. It is possible for, in each case, one section which is laid in folds to be provided in front of and behind the transverse web as viewed in the vehicle longitudinal direction.

The transverse web may be designed so as to permit a movement in all spatial directions in order to compensate a spring movement of the wheel carrier in the z direction, relative movements in the x and y directions resulting from the axle kinematics, and movements of the axle components resulting from the elastokinematics.

Along one longitudinal side of the main body, there is preferably provided at least one flexible strut which, in the installed state, faces toward a wheel carrier of the motor vehicle. The flexible strut can be used to realize a transmission of force and thus a deflection of the underbody panelling part by the wheel carrier, for example.

A particularly good adaptation can be achieved if the flexible strut has flexible longitudinal webs, which converge at one end, and multiple flexible transverse webs which run parallel and which extend between the longitudinal webs, transversely with respect thereto. In other words, it is advantageous for the flexible strut to be constructed such that it can utilize the so-called fin ray effect. In this case, owing to the connection of two elastic outer webs to multiple flexible transverse webs which run in parallel and which become shorter in the longitudinal direction of the component, the effect arises that, when a force acts in the region of the end at which the longitudinal webs are spaced further apart, the end at which the longitudinal webs converge on one another curves in the direction of the action of force, and not away from the latter.

It is preferable if, along the longitudinal side of the main body, there are provided flexible struts with convergent ends, wherein the ends are directed away from one another, or one continuous flexible strut with two opposite converging ends. In this way, the fin ray effect can be utilized in order, in the event of a transmission of force to a region in the middle of the underbody panelling part by way of a steering movement, to bring about a pivoting-out movement of the front or rear edge, respectively, of the main body in the direction of the wheel in order to close the gaps that form.

Optionally, the transverse web lies between two flexible struts, such that, as a result of the fastening to the transverse link, good force transmission to the flexible struts is possible.

The invention also relates to a subassembly having an underbody panelling part according to the invention. The panelling part is mechanically coupled to the wheel suspension of the vehicle, more precisely to a part of the wheel suspension that moves during a wheel steering deflection, such that the covering surface is varied as a result of a wheel steering deflection. In particular, the underbody panelling part is mechanically coupled to the wheel carrier. The covering surface of the underbody panelling part may be varied, for example, by way of contact with a wheel suspension part which moves during the wheel steering deflection.

The subassembly thus comprises the underbody panelling part, the mechanical coupling and at least the corresponding part of the wheel suspension.

The transverse web may be fastened to a transverse link of the vehicle.

For the transmission of the steering movement, it may be provided that, on a wheel carrier of the vehicle, there are provided two guide projections which face toward the panelling part and which each, during a steering movement to the right or to the left, come into contact with the underbody panelling part, in particular with the one or more flexible struts.

The underbody panelling part may also have the effect of at least partially sealing off the wheel arch region against the ingress or emergence of air flows.

If, in the case of wheel arches through which cooling air flows, it is necessary to ensure good ventilation of the wheel arch, the underbody panelling part may optionally, at its end directed toward the vehicle rear end, delimit an air duct which is oriented substantially horizontally. The air duct permits an outflow of air from the wheel arch in a substantially horizontally directed air stream without turbulence, which would increase the air resistance.

The optional air duct may be formed by a gap between the underbody panelling part and an adjacent vehicle body section, through which gap the air can flow in parallel along the underbody of the vehicle.

Through the provision of an underbody panelling part of this type, it is possible for a ram lip or a ram body normally provided in the region of the front of the vehicle to be decreased in size, or omitted entirely.

The overall geometry of the underbody panelling part may be adapted by a person skilled in the art to the geometry of the wheel arch region and the required free travel of the underbody panelling part in all arising operating situations and driving states.

Other objects, advantages and novel features of the present invention will become apparent from the following detailed description of one or more preferred embodiments when considered in conjunction with the accompanying drawings.

DETAILED DESCRIPTION OF THE DRAWINGS

The illustration in the figures is not true to scale.

Figure 1:
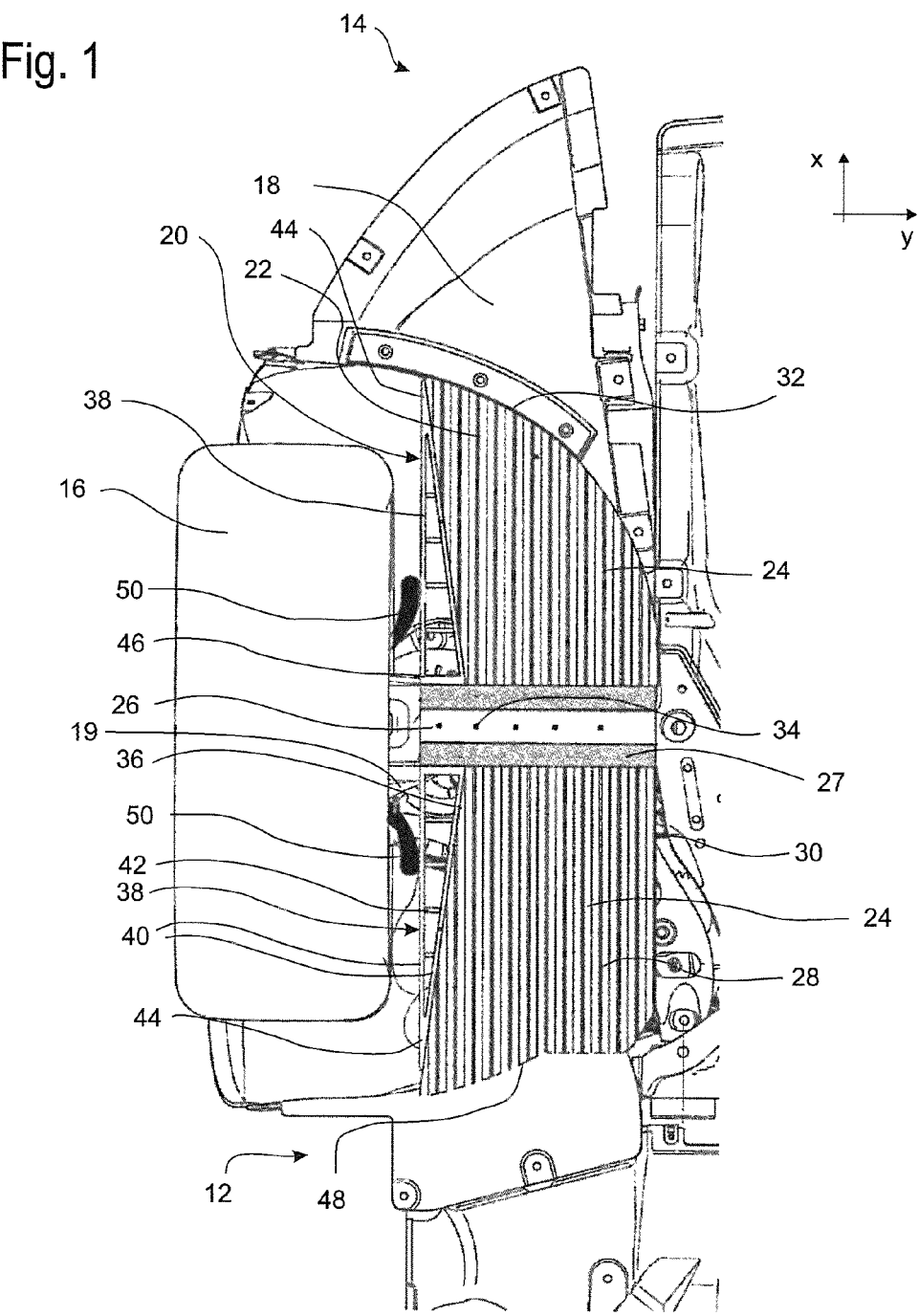
FIG. 1 is a schematic view of part of an underbody of a vehicle with a subassembly having an underbody panelling part according to an embodiment of the invention.

FIG. 1 shows, from below, part of an underbody of a motor vehicle 12 in the region of the front end 14 thereof, the front wheel 16 and an associated wheel arch 18. The wheel 16 is fastened to a wheel carrier 19. Here, an underbody panelling part 20 extends approximately horizontally through the wheel arch 18 and covers, inter alia, a steering linkage and a wheel suspension in the direction of the roadway.

The underbody panelling part 20 has a main body 22, which has two sections 24 which are laid with substantially parallel folds and which are connected by a transverse web 26 composed of a suitable elastic material. The folds run approximately in the vehicle longitudinal direction x.

Here, the transverse web 26 is positioned at the level of the wheel axle over a symbolically illustrated transverse link 27 of the vehicle 12, and divides the main body 22 into a front section and a rear section, which are of approximately equal size.

The transverse web 26 runs preferably in the vehicle transverse direction y and lies in the center of the wheel in the longitudinal direction as viewed from below.

The sections 24 are both composed of a flexible, weather-resistant material which is resistant to environmental influences, for example a suitable plastic or a suitable coated fabric. In the region of the fold edges there are arranged reinforcement structures 28, for example flexible but substantially inherently rigid bars or ribs, such that the sections 24 are of substantially self-supporting form.

Owing to the sections 24 which are laid in folds, the main body 22 can vary its covering surface by virtue of the folds being pulled apart or pushed together. This may take place in sections, for example individually in the two sections 24 which are laid in folds, or else only in individual regions of the respective sections 24.

Along a first longitudinal side 30, which is directed toward the inner side of the wheel arch 18, the underbody panelling part 20 is in this case screwed firmly and areally to the inner side of the wheel arch 18 in order to fix the underbody panelling part. At its front edge 32, at which the folds must be movable transversely with respect to the vehicle longitudinal direction x, the underbody panelling part 20 may be received in a guide (not illustrated in any more detail) so as to be displaceable in the y direction, in order to prevent a movement of the front edge 32 in the direction perpendicular to the plane of the drawing.

Here, the underbody panelling part 20 is connected fixedly and substantially non-displaceably via the transverse web 26 to the transverse link 27, situated therebelow, of the vehicle 12, for example by way of fastening structures 34 in the form of screw connections. The elasticity of the transverse web 26 and of the sections 24 however permits a movement in all three spatial directions, such that the underbody panelling part 20 can adapt to the vehicle and wheel movements.

Along the non-fixed longitudinal side 36, which is situated opposite the longitudinal side 30, two flexible struts 38 are fixedly connected to the sections 24.

Each of the flexible struts 38 is constructed in accordance with the fin ray effect. Two elongate longitudinal webs 40, which are oriented so as to converge on one another at one end, are connected by way of multiple transverse webs 42 which are arranged parallel to one another and which become progressively shorter toward the converging end. As a result, the elastic strut 38 tapers to a point at one end 44, whereas, at its other end 46, the elastic strut has a predetermined width by which the two longitudinal webs 40 are spaced apart from one another.

Both the longitudinal webs 40 and the transverse webs 42 are of elastic form to a certain extent, which has the effect that, when a force acts in the region of the wide end 46, the end 44 which tapers to a point curves in the direction of the action of force and not away from the latter.

The two elastic struts 38 are arranged such that their ends 44 which taper to a point are directed toward the front edge 32 and toward the rear edge 48 of the underbody panelling part 20, wherein the flexible struts 38 together extend substantially over the entire length of the main body 24 in the vehicle longitudinal direction x.

The two wide ends 46 adjoin the transverse web 26.

On the wheel carrier 19 there are arranged two guide projections 50 which project from the wheel carrier 19, at both sides of the wheel axle, in the direction of the underbody panelling part 20. The two guide projections 50 are of approximately blade-like form, and in the straight-ahead position illustrated in FIG. 1, are in contact with in each case one of the elastic struts 38 in the region of the wide end 46 thereof. In the event of a steering movement and a steering deflection of the wheel 16, in each case one of the guide projections 50 exerts a force on one of the flexible struts 38, which has the effect that the respective tapering end 44, and thus the upper or lower left-hand corner of the underbody panelling part 20 in FIG. 1, curves around the wheel 16. Here, the end 44 of the flexible struts 38 pulls the folds of the respective section 24 apart.

It would self-evidently be possible for the movement of the panelling part 20 to also be derived from a movement of another part of the wheel suspension that moves during the wheel steering deflection.

Optimum coverage of the underbody 10 in the region of the wheel arch 18 is realized in this way. Through corresponding adaptation of the shape, stiffness, length and extent of the flexible struts 38, of the transverse web 26 and of the sections 24 which are laid in folds, the underbody panelling part 20 can be easily adapted to different vehicle geometries, so as to always realize optimum coverage of the underbody in the region of the wheel arch 18.

Figure 2:
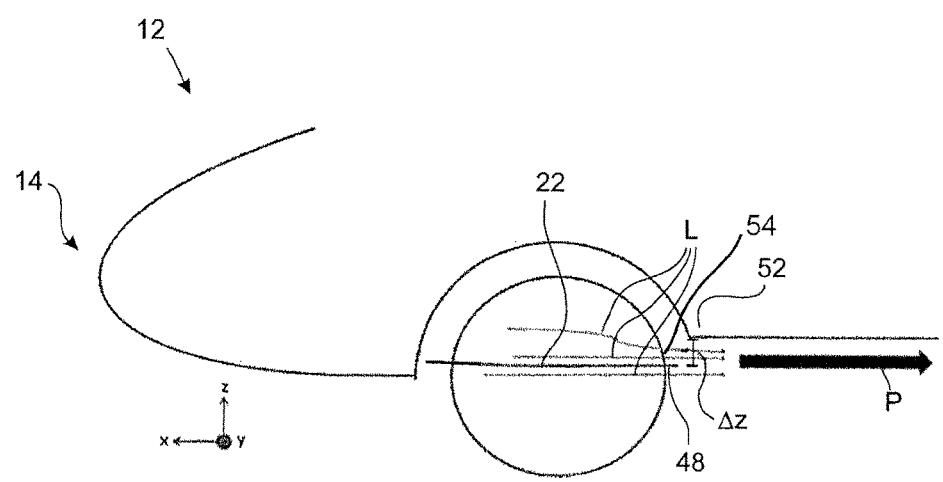
FIG. 2 is a schematic sectional view of the front of a vehicle, illustrating the air flows in the region of an underbody panelling part according to the embodiment of the invention.

The air flow that forms along and below the underbody panelling part 20 is denoted in FIG. 2 by the arrow L. It can be seen that the air flows along, substantially without turbulence, parallel to the horizontal profile of the main body 22 of the underbody panelling part 20. The arrows K show the cooling air flow from the interior of the wheel arch 20.

Between the rear edge 48 of the underbody panelling part 20 and a section 52 of the adjoining vehicle body or vehicle panelling which adjoins the wheel arch 18 in the longitudinal direction, there is formed, in the example shown here, an air duct 54 with the vertical height $\Delta z$, such that the air duct 54 is formed between the underbody panelling part 20 and the section 52 of the vehicle body. The air duct allows the air flowing out of the wheel arch 18 to flow off parallel to the underbody of the vehicle 12 (see arrow P in FIG. 2). Turbulence and thus increased air resistance are prevented in this way.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An underbody panelling part of a wheel axle in a region of a wheel arch of a motor vehicle, comprising:
a main body of the underbody panelling part, wherein the main body has a variable covering surface,
the main body has a fastening structure for a fixed connection to a vehicle body of the motor vehicle and/or a fastening structure for a fixed connection to a transverse link of the motor vehicle, and
the main body has at least one section which is reversibly pulled apart and pushed together in a transverse direction of the motor vehicle.

2. The underbody panelling part according to claim 1, wherein the main body is configured to be flexible for varying the covering surface.

3. The underbody panelling part according to claim 1, wherein the at least one section has substantially parallel folds and is reversibly pulled apart and pushed together in the transverse direction relative to a longitudinal extent of the substantially parallel folds.

4. The underbody panelling part according to claim 1, further comprising at least one transverse web that extends transversely with respect to a longitudinal vehicle axis, the transverse web being composed of an elastic material and being provided in the underbody panelling part.

5. The underbody panelling part according to claim 1, wherein along one longitudinal side of the main body at least one flexible strut is provided, the at least one flexible strut facing toward a wheel carrier of the motor vehicle in an installed state.

6. The underbody panelling part according to claim 5, wherein the flexible strut comprises flexible longitudinal webs which converge at one end, and multiple transverse webs arranged in parallel and which extend transversely between the flexible longitudinal webs.

7. The underbody panelling part according to claim 6, wherein along the longitudinal side of the main body, at least two flexible struts are provided, each flexible strut having a convergent end, wherein the ends are directed away from one another.

8. A subassembly, comprising:
a wheel suspension of a motor vehicle;
an underbody panelling part of a wheel axle in a region of a wheel arch of the motor vehicle, the underbody panelling part comprising:
a main body of the underbody panelling part, wherein the main body has a variable covering surface, and
the main body has a fastening structure for a fixed connection to a vehicle body of the motor vehicle and/or a fastening structure for a fixed connection to a transverse link of the motor vehicle, wherein the underbody panelling part is coupled to the wheel suspension of the motor vehicle such that the covering surface is varied as a result of a wheel steering movement.

9. The subassembly according to claim 8, further comprising:
a transverse link of the motor vehicle; and
a transverse web provided in the underbody panelling part, the transverse web extending transversely with respect to a vehicle longitudinal axis and being composed of an elastic material, wherein
the transverse web is fastened to the transverse link of the motor vehicle.

10. The subassembly according to claim 8, further comprising a wheel suspension component movable during wheel steering movement, wherein the covering surface of the underbody panelling part is varied based on contact with the wheel suspension component.

11. The subassembly according to claim 8, further comprising:
a wheel carrier of the motor vehicle having two guide projections facing toward the underbody panelling part, wherein
during a steering movement, at least one of the guide projections comes into contact with the underbody panelling part.

12. The subassembly according to claim 11, wherein the underbody panelling part has, along one longitudinal side of the main body, at least one flexible strut which, in an installed state, faces toward the wheel carrier of the motor vehicle, and
wherein during the steering movement, the at least one guide projection comes into contact with the at least one flexible strut.

13. The subassembly according to claim 8, wherein the underbody panelling part is firmly fixed to the wheel arch in sections along one longitudinal side thereof.

14. The subassembly according to claim 8, wherein the underbody panelling part delimits, at a rear edge directed toward a rear end of the motor vehicle, an air duct which is oriented substantially horizontally.

15. The subassembly according to claim 14, wherein the air duct is formed by a gap between the underbody panelling part and an adjacent vehicle body section of the motor vehicle.

* * * * *